United States Patent [19]
Raabe et al.

[11] 3,868,377
[45] Feb. 25, 1975

[54] N-BENZHYDRYL-N'-p-HYDROXYBENZYL-PIPERAZINES AND PROCESSES FOR THEIR MANUFACTURE

[75] Inventors: Thomas Raabe, Heusenstamm; Josef Scholtholt, Frankfurt; Eckhard Schraven, Frankfurt-Fechenheim; Rolf-Eberhard Nitz, Bergen-Enkheim, all of Germany

[73] Assignee: Cassella Farbwerke Mainkur Aktiengesellschaft, Frankfurt am Main-Fechenheim, Germany

[22] Filed: May 29, 1973

[21] Appl. No.: 364,764

[30] Foreign Application Priority Data
June 2, 1972 Germany.............................. 2226767
Mar. 12, 1973 Germany.............................. 2312212

[52] U.S. Cl............................. 260/268 BZ, 424/250
[51] Int. Cl.............................................. C07d 51/70
[58] Field of Search.............................. 260/268 BZ

[56] References Cited
UNITED STATES PATENTS
2,709,169  5/1955  Morren........................ 260/268 BZ
3,051,710  8/1962  Biel............................ 260/268 BZ

*Primary Examiner*—Alton D. Rollins
*Assistant Examiner*—Jose Tovar
*Attorney, Agent, or Firm*—Francis M. Crawford

[57] ABSTRACT

The present invention relates to new, pharmaceutically valuable N-benzhydryl-N'-p-hydroxybenzyl-piperazines of the general formula:

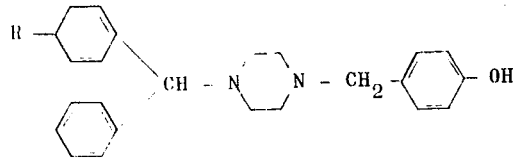

wherein R denotes chlorine or hydrogen, their acid addition salts and processes for their manufacture.

The compounds are particularly suitable for the treatment of disturbances of cerebral blood flow and can be prepared by reacting an N-benzhydryl-piperazine of the formula

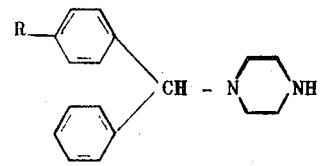

with p-hydroxybenzaldehyde in the presence of catalytically activated hydrogen or by reacting a diphenyl-bromomethane of the formula

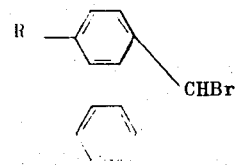

with N-p-hydroxybenzyl-piperazine of the formula

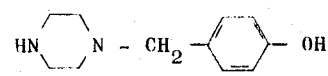

or by splitting off the radical R¹ from a compound of the formula

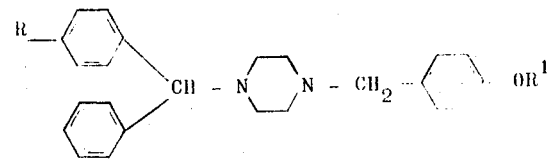

and replacing the radical R¹ by hydrogen.

3 Claims, No Drawings

N-BENZHYDRYL-N'-P-HYDROXYBENZYL-PIPERAZINES AND PROCESSES FOR THEIR MANUFACTURE

The present invention relates to N-benzhydryl-N'-p-hydroxybenzyl-piperazines of the general formula I:

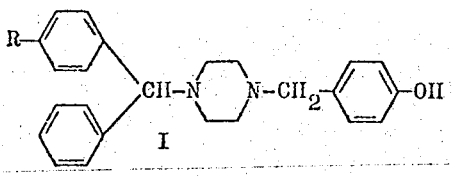

wherein R denotes chlorine or hydrogen, their acid addition salts and processes for their manufacture.

The N-benzhydryl-N'-p-hydroxybenzyl-piperazines of the general formula I are preferably manufactured by reaction of N-benzhydryl-piperazines of the general formula II with p-hydroxybenzaldehyde of the formula III in the presence of catalytically activated hydrogen:

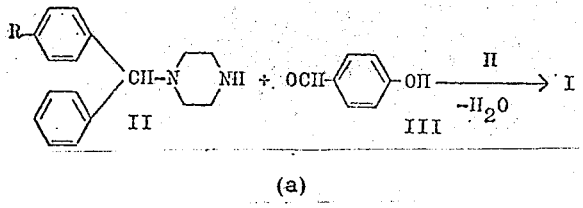

(a)

Appropriately, the starting compounds are dissolved in a suitable solvent, for example an alcohol such as, for example, methanol or ethanol, and the reaction is carried out at room temperature or elevated temperature. The preferred temperature for the hydrogenation is between 20° and 50°C. The hydrogen pressure is 30 to 100 atmospheres, preferably 40 to 70 atmospheres.

The catalyst used is preferably Raney nickel, but it is also possible to use other suitable hydrogenation catalysts, such as, for example, Raney cobalt, platinum dioxide and the like. The reaction conditions must be so chosen that no p-cresol is eliminated from the compounds of the general formula I.

The compounds of the general formula I can also be manufactured by reacting a diphenylbromomethane of the general formula IV with N-p-hydroxybenzyl-piperazine of the formula V:

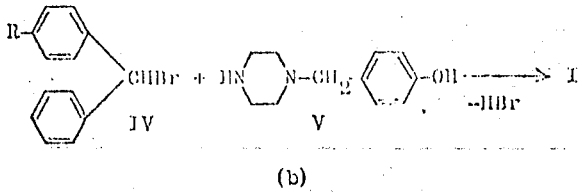

(b)

This reaction is also appropriately carried out in a suitable solvent in which the starting components are dissolved or suspended. Suitable solvents are aprotic polar and non-polar organic solvents, for example aromatic hydrocarbons such as, for example, benzene, toluene or xylene, ethers such as, for example, dioxane and tetrahydrofurane, dimethylsulphoxide, dimethylformamide and N-methylpyrrolidone.

The reaction b is appropriately carried out in the presence of an acid-binding agent which binds the hydrogen bromide liberated during the reaction. As acid-binding agents it is possible to use, for example, potassium carbonate, sodium carbonate, sodium bicarbonate and the like. It is however also possible to employ a molar excess of the N-p-hydroxybenzyl-piperazine of the formula V, so that the molar ratio of the diphenylbromomethane of the general formula IV to the N-p-hydroxybenzyl-piperazine of the formula V is then 1:2. The N-p-hydroxybenzyl-piperazine of the formula V then serves as a reactant and an acid-binding agent.

The reaction b is normally carried out at temperatures of 50° to 150°C, preferably at 80° to 120°C.

The compounds of the general formula I can also be manufactured by splitting off the radical $R^1$, and replacing it by hydrogen, in a N-benzhydryl-N'-benzyl-piperazine of the general formula VI

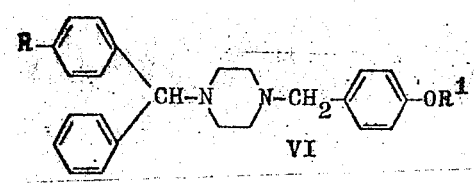

wherein R denoted chlorine or hydrogen and $R^1$ denotes a radical which can be split off by hydrolysis, ether splitting or hydrogenation. Depending on the nature of the radical $R^1$, the radical $R^1$ is split off by hydrolysis, ether splitting or hydrogenation. Suitable radicals which can be split off by hydrolysis are, for example, acyl radicals, that is to say radicals of carboxylic acids, especially radicals of lower carboxylic acids with 1 to 4 C atoms, such as, for example, the acetyl, propionyl or butyryl radical.

Examples of suitable radicals which can be split off by an ether splitting are alkyl radicals, especially alkyl radicals with 1 to 4 C atoms, such as, for example, the methyl, ethyl or butyl group. Radicals which can be split off by a hydrogenation are, for example, the benzyl group and the p-methylbenzyl group.

The radical $R^1$ is split off according to the following equation:

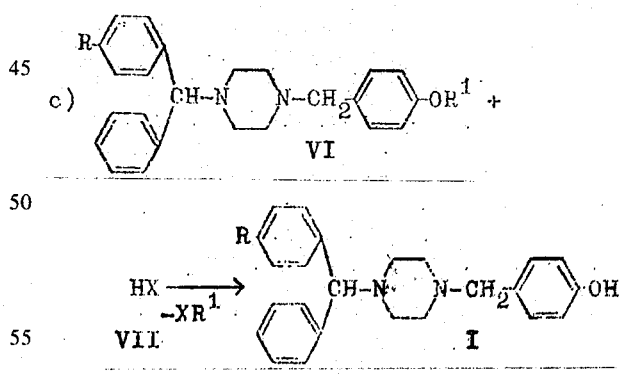

Herein, X represents OH, H, CL, Br or I.

In the case of X = OH, the agent which causes the splitting-off, of the general formula VII, is water, which is used, for example, when splitting off an acyl radical by hydrolysis. The hydrolysis is appropriately carried out in aqueous alkali solutions, for example dilute sodium hydroxide solution or potassium hydroxide solution. The temperature during the hydrolysis is normally 20° to 100°C, preferably 20 to 50°C.

In the case of X = H, the agent which causes the splitting-off, of the general formula VII, is hydrogen. The radicals which can be split off by hydrogenation can be split off by catalytic hydrogenation or by hydrogenation with complex hydrides such as, for example, sodium borohydride. The catalytic hydrogenation is carried out in a suitable solvent, for example an alcohol such as methanol or ethanol, at room temperature or elevated temperature. The preferred temperature for the catalytic hydrogenation is between 20° and 50°C. The hydrogen pressure is 30 to 100 atmospheres, preferably 40 to 70 atmospheres. Raney nickel is preferably used as the catalyst but it is also possible to use other suitable hydrogenation catalysts such as, for example, Raney cobalt, platinum dioxide and the like. The splitting off of the radical $R^1$ by complex hydrides is normally carried out by heating the complex hydride, for example the sodium borohydride, and the starting product of the general formula VI in an alcoholic solution, for example ethanolic solution. In general, the heating is effected by boiling under reflux. Finally, water or acid is added and the mixture is worked up in the usual manner.

A radical $R^1$ which can be split off by ether splitting, especially an alkyl radical with 1 to 4 C atoms, can be split off, for example, by HI, HBr, HCL, $AlCl_3$ or $AlBr_3$. For this, the reaction conditions known for the ether splitting reaction are observed, that is to say the reaction temperatures can be 60° to 140°C, preferably 80° to 110°C. When using HBr, boiling glacial acetic acid is appropriate as a solvent. When splitting the ether with aluminium chloride or aluminium bromide, the components are warmed in benzene or some other suitable solvent and the aluminium compound which is formed is finally decomposed with water.

In each case, the radical $R^1$ of the compound of the general formula VI is replaced by hydrogen.

The requisite starting compounds of the general formula VI can be manufactured in various ways, for example by reacting a piperazine compound of the general formula VIII with a benzyl chloride of the general formula IX according to the following equation:

tained. Mono-salts, that is to say acid addition compounds with only one acid radical, are obtained if the compounds of the general formula I are reacted with exactly one mol of the appropriate acid. Pharmacologically tolerable salts are preferred.

The compounds of the general formula I and their pharmacologically tolerable acid addition salts possess valuable pharmacological properties. Thus, for example, they are particularly suitable for the treatment of disturbances of cerebral blood flow and for this purpose are superior to known preparations. The compounds of the general formula I and their pharmacologically tolerable acid addition salts can therefore be used by themselves, mixed with one another or mixed with pharmaceutically harmless diluents or excipients, as pharmaceutical preparations, for example in the form of tablets, capsules, aqueous or oily solutions or suspensions, emulsions or injectable aqueous or oily solutions or suspensions, or in the form of dispersible powders or aerosol mixtures. The compounds of the general formula I or their pharmacologically tolerable acid addition salts can also be combined, in one pharmaceutical preparation, with one or more other pharmaceutically acitve substances such as, for example, sedatives, such as, for example, barbituric acid derivatives, 1,4-benzodiazepines and Meprobamat, with vasodilators such as, for example, glycerine trinitrate and carbochromene, with diuretics such as, for example, chlorothiazide, with agents which improve the tonus of the heart, such as, for example, digitalis preparations, with hypotensive agents such as, for example, rauwolfia alkaloids, and with substances which lower the fatty acid level in the blood such as, for example, Clofibrat.

The pharmaceutical investigation of the brain perfusion-assisting action was carried out on narcotised dogs, observing the change in the perfusion of the brain surface and the change in the oxygen pressure of the brain surface. The dogs were narcotised with urethane-Chloralose-Dial-Nembutal (250-15-10-4 mg/kg i.v.). The bony skull and the Dura mater were opened over

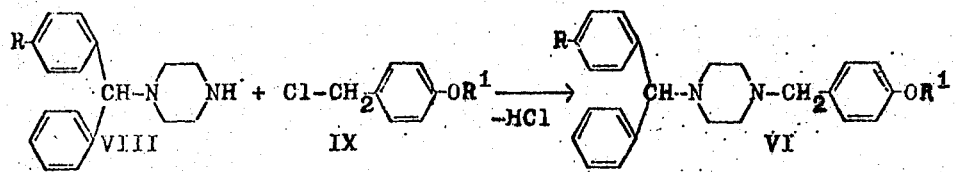

Herein, R and $R^1$ have the meaning already mentioned. The reaction is carried out in an anhydrous solvent, such as, for example, toluene, benzene, or dioxane, at temperatures of 50° to 120°C, in the presence of 1 mol of an acid-binding agent. As the acid-binding agent it is possible to use, for example, potassium carbonate, sodium carbonate, sodium bicarbonate and the like or an excess of one mol of the compound of the general formula VIII.

The acid addition salts can be manufactured from the compounds of the general formula I in a manner which is in itself known, by combining the components in a suitable solvent. The compounds of the general formula I form acid addition salts with inorganic or organic acids. Examples of such acids are hydrogen chloride, hydrogen bromide, phosphoric acid, sulphuric acid, oxalic acid, lactic acid, tartaric acid, acetic acid, salicylic acid, benzoic acid, citric acid, ascorbic acid or adipic acid. With an excess of acid, the di-salts are obthe left half of the brain to make a circular aperture of diameter 2 to 3 cm and a heat conduction probe (Type P 1 of Messrs.Hartmann & Braun AG, Frankfurt/Main) was applied under slight pressure to measure the local perfusion of the brain cortex (literature: K. GOLENHOFEN, H. HENSEL and G. HILDEBRANDT: "Durchblutungsmessung mit Warmeleitelementen in Forschung und Klinik" ("Perfusion Measurement with Heat Conductor Elements, in Research and Clinical Practice"), Georg Thieme Verlag Stuttgart, 1963). Parallel to the heat conduction probe, a Teflon-coated multi-wire platinum electrode of Messrs. Eschweiler, Kiel, was applied to the brain to measure the local oxygen pressure. (Literature: D.W. LUBBERS "Methods of measuring oxygen tensions of blood and organ surfaces" in D.P.PAYNE and D.W.HILL "Oxygen Measurements in Blood and Tissues and their Significance" J. & A. Churchill Ltd., London 1966). The blood pressure in the femoral artery was measured with a STATHAM pressure recorder.

The results of the pharmacological investigations are summarised in the table which follows.

| Preparation | Dosage mg/kg | Maximum change in perfusion of the brain surface in % | Maximum change in perfusion of the brain surface in min. | Maximum change of the oxygen pressure in the brain surface in % | Maximum change of the oxygen pressure in the brain surface in min. | Maximum change of the blood pressure (systolic/diastolic) in % | Maximum change of the blood pressure (systolic/diastolic) in min. |
| --- | --- | --- | --- | --- | --- | --- | --- |
| N-Benzhydryl-N'-p-hydroxybenzyl-piperazine dihydrochloride | 1.0 i.v. | +73 | 20 | +12 | 12 | −11/−6 | 8 |
|  | 2.0 i.v. | +87 | 30 | +23 | 20 | −10/−20 | 20 |
|  | 20.0 i.d. | +123 | 60 | +36 | 30 | −13/−13 | 12 |
| Comparison preparation: Cinnarizine | 1.0 i.v. | +43 | 7 | +20 | 8 | −13/−13 | 6 |
|  | 25.0 i.d. | 0 | 0 | 0 | 0 | 0 | 0 |
|  | 125.0 i.d. | 0 | 0 | 0 | 0 | 0 | 0 |

EXAMPLE 1

7.6 g. of N-benzhydryl-piperazine and 16 g of p-hydroxybenzaldehyde are dissolved in 140 ml of anhydrous ethanol, approx. 2 g of Raney nickel are added and the mixture is hydrogenated for 24 hours at 35°C under 50 atmospheres of hydrogen. The nickel is then filtered off and the filtrate is concentrated in a water pump vacuum. A semi-solid residue remains, which is thoroughly triturated with 2 N hydrochloric acid, whereupon it solidifies. The residue is filtered off and then repeatedly stirred with a large amount of water for a prolonged period at room temperature. The combined aqueous solutions are then rendered alkaline with aqeuous sodium carbonate solution, whereupon a precipitate separates out. It is filtered off and recrystallised from dioxane. N-Benzhydryl-N'-p-hydroxybenzyl-piperazine is thus obtained together with 1 mol of dioxane of crystallisation, in the form of colourless crystals of melting point 110°C. If the product is recrystallised from toluene instead of dioxane, N-benzhydryl-N'-p-hydroxybenzyl-piperazine is obtained solvent-free in the form of colourless crystals of melting point 175°C. The recrystallised product is then dissolved in anhydrous diethyl ether, a small amount of residue is filtered off and the hydrochloride is precipitated by means of a saturated solution of hydrogen chloride in anhydrous diethyl ether. N-Benzhydryl-N'-p-hydroxybenzyl-piperazine dihydrochloride of melting point 225°C is thus obtained.
Yield: 9.3 g (72 percent of theory)
($C_{24}H_{28}Cl_2N_2O$)

| Calculated: | C 66.7 | H 6.5 | N 6.5 | Cl 16.4 |
| --- | --- | --- | --- | --- |
| Found: | 66.5 | 6.5 | 6.5 | 16.1 |

N-Benzhydrylpiperazine, required as the starting product, can be obtained in 63 percent yield in a known manner by alkylation of N-carboethoxy-piperazine with diphenylbromomethane in the presence of one mol of anhydrous sodium carbonate in boiling xylene and subsequent saponification and decarboxylation of the resulting N-benzhydryl-N'-carboethoxy-piperazine in boiling ethanolic potassium hydroxide solution.

If a two-fold molar amount of 90 percent strength phosphoric acid is added to a solution of N-benzhydryl-N'-p-hydroxybenzyl-piperazine in anhydrous ethanol and the mixture is then diluted with anhydrous diethyl ether, a slightly smeary precipitate separates out. The supernatant solution is decanted and the residue is repeatedly stirred with anhydrous diethyl ether. The residue, which is now colourless and crystalline, is filtered off. N-Benzhydryl-N'-p-hydroxybenzyl-piperazine diphosphate is thus obtained in practically quantitative yield.

Melting point from 125°C onwards, with slow decomposition.

The salts of the other acids can be manufactured analogously. Thus, the sulphate of melting point 245° (decomposition), is obtained with sulphuric acid and the dihydrobromide of melting point 195° (decomposition) is obtained with hydrogen bromide.

EXAMPLE 2

2.9 of N-(p-chlorobenzhydryl)-piperazine and 4 g of p-hydroxybenzaldehyde are dissolved in 80 ml of anhydrous ethanol, 500 mg of Raney nickel are added and the mixture is hydrogenated for 24 hours at 35°C under 50 atmospheres of hydrogen. The nickel is then filtered off and the filtrate is concentrated in a water pump vacuum. The oil which remains is dissolved in a mixture of anhydrous ethanol and anhydrous diethyl ether, dry hydrogen chloride gas is then passed into this solution and the precipitate which forms is filtered off. The hydrochloride is subsequently stirred into aqueous sodium bicarbonate solution and the product in finally taken up in chlorform. The chloroform phase is dried and concentrated in a water pump vacuum. The residue is taken up in anhydrous diethyl ether, a small amount of insoluble matter is filtered off, and dry hydrogen chloride gas is again passed into the ether solution. The hydrochloride, which is now in a well-crystallised form, is filtered off and recrystallised once from anhydrous ethanol.

N-(p-Chlorobenzhydryl)-N'-p-hydroxybenzyl-piperazine dihydrochloride is thus obtained in the form of colourless crystals of melting point 230°C.
Yield: 87 percent of theory.
($C_{24}H_{27}Cl_3N_2O$)

| Calculated: | C 61.8 | H 5.8 | N 6.0 | Cl 22.9 |
| --- | --- | --- | --- | --- |
| Found: | 61.8 | 5.8 | 6.1 | 22.6 |

N-(p-Chlorobenzhydryl)-piperazine, required as the starting product, can be obtained in good yield in a known manner by alkylation of N-carboethoxy-piperazine with phenyl-(p-chlorophenyl)-bromomethane in the presence of one mol of anhydrous sodium carbonate in boiling xylene, and subsequent saponification and decarboxylation of the resulting N-(p-chlorobenzhydryl)-N'-carboethoxy-piperazine in boiling ethanolic potassium hydroxide solution.

From N-(p-chlorobenzhydryl)-N'-p-hydroxybenzyl-piperazine dihydrochloride, the free base is obtained by means of aqueous sodium carbonate solution. After one recrystallisation from toluene, N-(p-chlorobenzhydryl)-N'-p-hydroxybenzyl-piperazine is obtained in the form of colourless crystals of melting point 59°C.

N-(p-Chlorobenzhydryl)-N'-p-hydroxybenzyl-piperazine can be converted with sulphuric acid, in the usual manner, into the sulphate of melting point 221°C (decomposition) and with hydrobromic acid into the dihydrobromide of melting point 199°C (decomposition).

EXAMPLE 3

19 g of N-(p-hydroxybenzyl)-piperazine are dissolved in 700 ml of anhydrous dioxane whilst heating under reflux. A solution of 12 g of diphenylbromomethane in 300 ml of dioxane is then added dropwise to the boiling solution. Thereafter the mixture is heated for 20 hours under reflux and then concentrated in vacuo, whereupon a semi-solid residue remains. This is suspended in aqueous sodium carbonate solution and then extracted three times with chloroform. The chloroform phase is washed with water, dried with sodium sulphate and concentrated in vacuo. An oil remains, which is taken up in diethyl ether and freed of a small amount of residue by filtration. The hydrochloride is then precipitated from the ether solution by means of hydrochloric acid gas, and is filtered off. Finally, the salt is converted into the base by means of aqueous sodium carbonate solution. After a single recrystallisation from toluene, N-benzhydryl-N'-p-hydroxybenzyl-piperazine is thus obtained in a yield of 73 percent of theory (relative to the diphenylbromomethane employed).

EXAMPLE 4

19 g of N-(p-hydroxybenzyl)-piperazine are dissolved in 700 ml of anhydrous dioxane whilst heating under reflux. A solution of 13.5 g of p-chlorodiphenylbromomethane is then added dropwise to the boiling solution. Thereafter the solution is heated for 18 hours under reflux and subsequently worked up analogously to Example 3. After a single recrystallisation from toluene, N-(p-chlorobenzhydryl)-N'-p-hydroxybenzyl-piperazine is thus obtained in the form of colourless crystals of melting point 59°C, in a yield of 77 percent of theory.

EXAMPLE 5

8 g of N-benzhydryl-N'-p-methoxybenzyl-piperazine in a mixture of 35 ml of glacial acetic acid and 35 ml of 48 percent strength hydrobromic acid are heated for one hour under reflux. The solution is then diluted with water and adjusted to pH 8 with 2 N sodium hydroxide solution. The mixture is then repeatedly extracted by shaking with chloroform. The chloroform phase, after washing with water, drying and concentration in vacuo, leaves a resinous residue which after dissolving in diethyl ether and passing hydrogen chloride into the solution yields a crystalline hydrochloride which is converted into the base by means of aqueous sodium carbonate solution. After one recrystallisation of the base from toluene, N-benzhydryl-N'-p-hydroxybenzyl-piperazine is thus obtained in a yield of 69% of theory.

To manufacture the N-benzhydryl-N'-p-methoxybenzyl-piperazine required as the starting product, 7.6 g of N-benzhydryl-piperazine and 17 g of p-methoxybenzaldehyde are dissolved in 150 ml of anhydrous ethanol, 500 mg of Raney nickel are added and the mixture is hydrogenated for 36 hours at 35°C under 50 atmospheres of hydrogen. The nickel is then filtered off and hydrogen chloride gas is passed into the filtrate. The hydrochloride is filtered off and stirred with aqueous sodium bicarbonate solution, the product is taken up in chloroform and the chloroform phase is concentrated. The residue is distilled. N-Benzhydryl-N'-p-methoxybenzyl-piperazine (boiling point 227° – 235°C/1 mm Hg, melting point 116°C) is thus obtained in 79 percent yield.

Analogously, reaction of p-chlorobenzhydrylpiperazine with p-methoxybenzaldehyde in the presence of Raney nickel and hydrogen yields N-(p-chlorobenzhydryl)-N'-p-methoxybenzyl-piperazine in 81 percent yield (boiling point 247° – 252°C/2 mm Hg).

EXAMPLE 6

8.8 g of N-(p-chlorobenzhydryl)-N'-p-methoxybenzyl-piperazine in a mixture of 35 ml of glacial acetic acid and 35 ml of 48 percent strength hydrobromic acid are heated for two hours under reflux. The mixture is then worked up analogously to Example 5. N-(p-Chlorobenzhydryl)-N'-p-hydroxybenzyl-piperazine is thus obtained in a yield of 72 percent of theory.

N-(p-Chlorobenzhydryl)-N'-p-hydroxybenzyl-piperazine can be converted in the usual manner with sulphuric acid into the sulphate of melting point 221°, with decomposition, and with hydrobromic acid into the dihydrobromide of melting point 199°C, with decomposition.

N-(p-Hydroxybenzyl)-piperazine required as the starting product in Example 3 and 4 can be manufactured as follows:

20 g of p-hydroxybenzaldehyde and 140 g of piperazine are dissolved in 1,300 ml of anhydrous ethanol and then hydrogenated, with addition of 10 g of Raney nickel, for 20 hours at 35°C and 50 atmospheres hydrogen pressure. The nickel is then filtered off and the filtrate is concentrated. The residue is dissolved in 1 l of anhydrous ethanol and a solution of 9 g of sodium methylate in 200 ml of ethanol is added thereto. The mixture is subsequently concentrated in vacuo, whereupon a solid residue remains which is repeatedly thoroughly triturated with toluene. The toluene-insoluble part is finally suspended in 200 ml of toluene and then hydrogen chloride gas is passed into this suspension until it is saturated. The precipitate is filtered off and suspended in 200 ml of anhydrous dioxane, and ammonia is finally passed into this suspension until saturation is reached. The residue is filtered off and the dioxane filtrate is concentrated in vacuo. A crystalline product remains, which is recrystallised once from dioxane.

N-(p-Hydroxybenzyl)-piperazine of melting point 188°C is thus obtained in 83 percent yield (calculated relative to p-hydroxybenzaldehyde).

What we claim is:

1. A compound of the formula

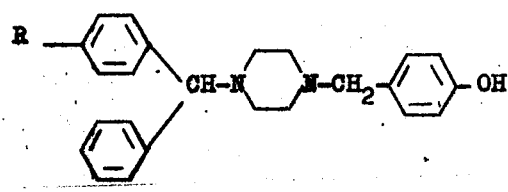

wherein R denotes a substituent selected from the group consisting of chlorine and hydrogen, or the non-toxic acid addition salts thereof 2. N-benzhydryl-N'-p-hydroxybenzyl-piperazine, or the non-toxic acid addition salts thereof.

3. N-(p-chlorobenzhydryl)-N'-p-hydroxybenzyl-piperazine, or the non-toxic acid addition salts thereof.

* * * * *